(12) United States Patent
Wikström et al.

(10) Patent No.: US 11,515,990 B2
(45) Date of Patent: Nov. 29, 2022

(54) CONTROL USING NR TDD

(71) Applicant: Telefonaktiebolaget LM Ericsson (publ), Stockholm (SE)

(72) Inventors: Gustav Wikström, Täby (SE); Ismet Aktas, Neuss (DE); Shehzad Ali Ashraf, Aachen (DE); Joachim Sachs, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/325,339

(22) PCT Filed: Dec. 21, 2017

(86) PCT No.: PCT/EP2017/084231
§ 371 (c)(1),
(2) Date: Feb. 13, 2019

(87) PCT Pub. No.: WO2018/127432
PCT Pub. Date: Jul. 12, 2018

(65) Prior Publication Data
US 2019/0207739 A1    Jul. 4, 2019

Related U.S. Application Data

(60) Provisional application No. 62/444,060, filed on Jan. 9, 2017.

(51) Int. Cl.
*H04L 5/14* (2006.01)
*H04L 5/00* (2006.01)

(52) U.S. Cl.
CPC .............. *H04L 5/14* (2013.01); *H04L 5/0053* (2013.01); *H04L 5/0055* (2013.01)

(58) Field of Classification Search
CPC ....... H04L 5/14; H04L 5/0053; H04L 5/0055; H04L 5/0091
See application file for complete search history.

(56) References Cited

U.S. PATENT DOCUMENTS

| | | | |
|---|---|---|---|
| 2009/0074090 A1* | 3/2009 | Xu ....................... | H04L 27/2647 375/260 |
| 2018/0110019 A1* | 4/2018 | Ly ....................... | H04L 27/2692 |
| 2018/0132270 A1* | 5/2018 | Zeng ..................... | H04L 1/12 |

FOREIGN PATENT DOCUMENTS

| | | |
|---|---|---|
| WO | 2016064049 A1 | 4/2016 |
| WO | 2016144243 A1 | 9/2016 |
| WO | 2016163623 A1 | 10/2016 |

OTHER PUBLICATIONS

International Search Report and Written Opinion dated Jun. 4, 2018, for corresponding International Application No. PCT/EP2017/084231, International filing date; Dec. 21, 2017; consisting of 10 pages.

(Continued)

*Primary Examiner* — Kevin C. Harper
(74) *Attorney, Agent, or Firm* — Christopher & Weisberg, P.A.

(57) ABSTRACT

A wireless device, network node and methods using new radio time division duplex, NR-TDD, are provided. In one embodiment, the network node includes processing circuitry configured to configure placement of downlink control messages over at least two symbols of a NR TDD slot. The at least two symbols are different symbols in the time domain.

8 Claims, 12 Drawing Sheets

(56) References Cited

OTHER PUBLICATIONS

Intel Corporation; Subframe Structure for NR dynamic TDD; 3GPP TSG RAN1 WG Meeting #87; Reno, Nevada, USA, Nov. 14-18, 2016; Consisting of 8 pages.
RP-161937; Status Report for RAN WG1 to TSG-RAN—3GPP TSG RAN #74 Vienna, Austria, Dec. 5-8, 2016; Consisting of 42 pages.
Japanese Office Action and Translation dated Jul. 17, 2020 for Application No. 2019-537176, consisting of 14-pages.
3GPP TSG RAN WG1 Meeting #87 R1-162695; Title: sPUCCH for shortened TTI; Source: NTT DOCOMO, Inc.; Agenda Item:6.2.10.2.3I Document for: Discussion and Decision; Location and Date: Reno, USA, Nov. 14-18, 2016, consisting of 12-pages.
Intellectual Property India Examination Report dated Nov. 25, 2020 for International Application No. 201917025923, consisting of 5-pages.

* cited by examiner

CONTROL USING NR TDD

CROSS-REFERENCE TO RELATED APPLICATIONS

This application is a Submission Under 35 U.S.C. § 371 for U.S. National Stage Patent Application of International Application No.: PCT/EP2017/084231, filed Dec. 21, 2017 entitled "CONTROL USING NR TDD," which claims priority to U.S. Provisional Application No. 62/444,060, filed Jan. 9, 2017, entitled "ROUND-TRIP OPTIMIZED CONTROL FOR URLLC USING NR TDD," the entireties of all of which are incorporated herein by reference.

TECHNICAL FIELD

This disclosure relates to wireless communications, and in particular, to configuring resources for control messages for optimizing Ultra-Reliable and Low-Latency Communications (URLLC) using new radio time division duplex (NR-TDD).

BACKGROUND

Under discussion are methods to enhance existing mobile communication systems to provide communication between a wide range of machines. A subgroup of this discussion relates to critical machine type communication (C-MTC) where the communication requirements of very low latency, very high reliability and very high availability must be fulfilled. Examples include:
factory automation, where actuators, sensors and control systems communicate with each other. Typical requirement is 1 ms latency;
Motion control within construction robots, 1 ms latency
Remote control of machines, 5-100 ms latency,
Smart energy grids, 3-5 ms
Among others.

Candidate communication systems to fulfill such requirements are, e.g., LTE and a newly developed radio access called new radio (NR) by Third Generation Partnership Project (3GPP). In NR, a scheduling unit is defined either as a slot or a mini-slot. A NR slot consists of several Orthogonal Frequency Division Multiplexing (OFDM) symbols where one possible outcome is that it consists of seven OFDM symbols, but other structures such as fourteen OFDM symbols can be used as well. Also under discussion is that a NR slot may or may not contain both the transmission in the uplink (UL) and the downlink (DL), respectively. Therefore, three configurations of slots are being discussed, namely: (1) DL-only slot (2) UL-only slot (3) Mixed DL and UL slot.

FIG. 1 shows different cases with seven OFDM symbols. The case with fourteen OFDM symbols is similar, for example by doubling the case of seven OFDM symbols. In particular, Case (1) relates to a slot consisting of downlink only OFDM symbols, case (2) relates to a slot consisting of uplink only OFDM symbols, and case (3) relates to a slot consisting of downlink symbols followed by a guard time and uplink symbols.

Furthermore, in NR systems, different OFDM numerologies will be used which determine the duration of the OFDM symbols. Table 1 lists different OFDM numerologies with different OFDM symbol durations, cyclic prefix durations, and symbol lengths including cyclic prefix. Additional numerologies to those shown in Table 1 can be used as well.

TABLE 1

Potential OFDM numerologies for NR

| Subcarrier spacing in kHz | OFDM symbol duration in µs | Cyclic prefix length in µs | Total symbol duration in µs |
|---|---|---|---|
| 15 | 66.67 | 4.76 | 71.43 |
| 30 | 33.33 | 2.38 | 35.71 |
| 60 | 16.67 | 1.19 | 17.86 |
| 120 | 8.33 | 0.60 | 8.93 |

To fulfill the requirements of latency critical applications (e.g., C-MTC use-cases as shown above), a mini-slot is also defined in NR. The starting position and length of the mini-slot is variable. The minimum possible length of a mini-slot is one OFDM symbol. However, the alignment of mini-slot and slot is relevant for better interworking and co-existence.

While still under discussion, the operation in NR-TDD is the most likely mode of operation for future systems in high frequency bands. Below are existing assumptions taken for NR-TDD operation:
UL-DL switching time: ~3 µs
Propagation time: ~0.33 µs/100 m
  +channel time dispersion (~CP)
  +fronthaul latency
Timing advance: 2*propagation delay
  +gNB UL-DL switching time
Maximum transmission
Time per slot (UL+DL): slot duration
  Timing advance
  UE DL-UL switching time

SUMMARY

Some embodiments advantageously provide a method, system and network node configuring resources for control messages for optimizing Ultra-Reliable and Low-Latency Communications, URLLC, using new radio time division duplex, NR-TDD.

According to one aspect of the disclosure, a network node using new radio time division duplex, NR TDD, is provided. The network node includes processing circuitry configured to configure positioning of at least two control messages over at least two symbols of a NR TDD slot. The at least two symbols are different symbols in a time domain.

According to one embodiment of this aspect, each control message corresponds to a respective symbol of the at least two symbols of the NR TDD slot. According to one embodiment of this aspect, the at least two control messages include: a downlink Hybrid Automatic Repeat Request, HARQ, configured to be positioned on a first symbol of the at least two symbols of the NR TDD slot; and a scheduling request configured to be positioned on a second symbol of the at least two symbols of the NR TDD slot. The first symbol is positioned, in the time domain, before the second symbol.

According to one embodiment of this aspect, a first control message of the at least two control messages are in a short Physical Uplink Control Channel, sPUCCH, and a second control message of the at least two control messages are in another sPUCCH within the NR TDD slot. According to one embodiment of this aspect, a second control message corresponds to the last symbol of the symbols used for uplink and/or corresponds to the last symbol of the NR TDD slot.

According to one embodiment of this aspect, the at least two control messages are at least two Physical Downlink Control Channel, PDCCH, messages or at least two Physical Uplink Control Channel, PUCCH, messages. According to one embodiment of this aspect, the at least two control messages include: a downlink assignment configured to be positioned on a first symbol of the at least two symbols of the NR TDD slot; and an uplink assignment or uplink Hybrid Automatic Repeat Request, HARQ, configured to be positioned on a second symbol of the at least two symbols of the NR TDD slot. The first symbol is positioned, in the time domain, before the second symbol.

According to one embodiment of this aspect, a first control message of the at least two control messages are in a short Physical Downlink Control Channel, sPDCCH, and a second control message of the at least two control messages are in another sPDCCH within the NR TDD slot. According to one embodiment of this aspect, the first control message corresponds to the first symbol of the symbols used for downlink and/or corresponds to a beginning symbol of the NR TDD slot. According to one embodiment of this aspect, the positioning of the at least two symbols in the time domain is based on at least one of a number of downlink symbols in the NR TDD slot, a number of guard symbols in the NR TDD slot and a number of uplink symbols in the NR TDD slot. According to one embodiment of this aspect, the at least two symbols are consecutive symbols in the NR TDD slot.

According to another aspect of the disclosure, a method for a network node using new radio time division duplex, NR TDD, is provided. Positioning of at least two control messages over at least two symbols of a NR TDD slot is configured. The at least two symbols are different symbols in a time domain.

According to one embodiment of this aspect, each control message corresponds to a respective symbol of the at least two symbols of the NR TDD slot. According to one embodiment of this aspect, the at least two control messages include: a downlink Hybrid Automatic Repeat Request, HARQ, configured to be positioned on a first symbol of the at least two symbols of the NR TDD slot; and a scheduling request configured to be positioned on a second symbol of the at least two symbols of the NR TDD slot. The first symbol is positioned, in the time domain, before the second symbol.

According to one embodiment of this aspect, the first control message of the at least two control messages are in a symbol provides a short Physical Uplink Control Channel, sPUCCH, and a second control message of the at least two control messages are in another sPUCCH within the NR TDD slot. According to one embodiment of this aspect, a second control message corresponds to the last symbol of the symbol used for uplink and/or corresponds to the last symbol of the NR TDD slot.

According to one embodiment of this aspect, the at least two control messages are at least two Physical Downlink Control Channel, PDCCH, messages or at least two Physical Uplink Control Channel, PUCCH, messages. According to one embodiment of this aspect, the at least two control messages include: a downlink assignment configured to be positioned on a first symbol of the at least two symbols of the NR TDD slot; and an uplink assignment or uplink Hybrid Automatic Repeat Request, HARQ, configured to be positioned on a second symbol of the at least two symbols of the NR TDD slot. The first symbol is positioned, in the time domain, before the second symbol.

According to one embodiment of this aspect, a first control message of the at least two control messages are in a short Physical Downlink Control Channel, sPDCCH, and a second control message of the at least two control messages are in another sPDCCH within the NR TDD slot. According to one embodiment of this aspect, the first control message corresponds to the first symbol of the symbols used for downlink and/or corresponds to a beginning symbol of the NR TDD slot. According to one embodiment of this aspect, the positioning of the at least two symbols in the time domain is based on at least one of a number of downlink symbols in the NR TDD slot, a number of guard symbols in the NR TDD slot and a number of uplink symbols in the NR TDD slot. According to one embodiment of this aspect, the at least two symbols are consecutive symbols in the NR TDD slot.

According to another aspect of the disclosure, a wireless device using new radio time division duplex, NR-TDD, is provided. The wireless device includes processing circuitry configured to: operate according to a configured positioning of at least two control messages over at least two symbols of a NR TDD slot. The at least two symbols are different symbols in a time domain.

According to one embodiment of this aspect, each control message corresponds to a respective symbol of the at least two symbols of the NR TDD slot. According to one embodiment of this aspect, the at least two control messages include: a downlink Hybrid Automatic Repeat Request, HARQ, configured to be positioned on a first symbol of the at least two symbols of the NR TDD slot; and a scheduling request configured to be positioned on a second symbol of the at least two symbols of the NR TDD slot. The first symbol is positioned, in the time domain, before the second symbol. According to one embodiment of this aspect, a first control message of the at least two control messages are in a short Physical Uplink Control Channel, sPUCCH, and a second control message of the at least two control messages are in another sPUCCH within the NR TDD slot.

According to one embodiment of this aspect, a second control message corresponds to the last symbol of the symbols used for uplink and/or corresponds to the last symbol of the NR TDD slot. According to one embodiment of this aspect, the at least two control messages are at least two Physical Downlink Control Channel, PDCCH, messages or at least two Physical Uplink Control Channel, PUCCH, messages. According to one embodiment of this aspect, the at least two control messages include: a downlink assignment configured to be positioned on a first symbol of the at least two symbols of the NR TDD slot; and an uplink assignment or uplink Hybrid Automatic Repeat Request, HARQ, configured to be positioned on a second symbol of the at least two symbols of the NR TDD slot. The first symbol is positioned, in the time domain, before the second symbol.

According to one embodiment of this aspect, a first control messages of the at least two control messages are in a short Physical Downlink Control Channel, sPDCCH, and a second control message of the at least two control messages are in another sPDCCH within the NR TDD slot. According to one embodiment of this aspect, the first control message corresponds to the first symbol of the symbols used for downlink and/or corresponds to a beginning symbol of the NR TDD slot. According to one embodiment of this aspect, wherein the positioning of the at least two symbols in the time domain is based on at least one of a number of downlink symbols in the NR TDD slot, a number of guard symbols in the NR TDD slot and a number of uplink symbols in the NR TDD slot. According to one embodiment of this aspect, the at least two symbols are consecutive symbols in the NR TDD slot.

According to another embodiment of the disclosure, a method for a wireless device using new radio time division duplex, NR-TDD, is provided. The wireless device operates according to a configured positioning of at least two control messages over at least two symbols of a NR TDD slot. The at least two symbols are different symbols in a time domain.

According to one embodiment of this aspect, each control message corresponds to a respective symbol of the at least two symbols of the NR TDD slot. According to one embodiment of this aspect, the at least two control messages include: a downlink Hybrid Automatic Repeat Request, HARQ, configured to be positioned on a first symbol of the at least two symbols of the NR TDD slot; and a scheduling request configured to be positioned on a second symbol of the at least two symbols of the NR TDD slot. The first symbol is positioned, in the time domain, before the second symbol. According to one embodiment of this aspect, a first control message of the at least two control messages are in a short Physical Uplink Control Channel, sPUCCH, and a second control message of the at least two control messages are in another sPUCCH within the NR TDD slot.

According to one embodiment of this aspect, second control message corresponds to the last symbol of the symbols used for uplink and/or corresponds to the last symbol of the NR TDD slot. According to one embodiment of this aspect, the at least two control messages are at least two Physical Downlink Control Channel, PDCCH, messages or at least two Physical Uplink Control Channel, PUCCH, messages. According to one embodiment of this aspect, the at least two control messages include: a downlink assignment configured to be positioned on a first symbol of the at least two symbols of the NR TDD slot; and an uplink assignment or uplink Hybrid Automatic Repeat Request, HARQ, configured to be positioned on a second symbol of the at least two symbols of the NR TDD slot. The first symbol is positioned, in the time domain, before the second symbol.

According to one embodiment of this aspect, a first control messages of the at least two control messages are in a short Physical Downlink Control Channel, sPDCCH, and a second control message of the at least two control messages are in another sPDCCH within the NR TDD slot. According to one embodiment of this aspect, the first control message corresponds to the first symbol of the symbols used for downlink and/or corresponds to a beginning symbol of the NR TDD slot.

According to one embodiment of this aspect, the positioning of the at least two symbols in the time domain is based on at least one of a number of downlink symbols in the NR TDD slot, a number of guard symbols in the NR TDD slot and a number of uplink symbols in the NR TDD slot. According to one embodiment of this aspect, the at least two symbols are consecutive symbols in the NR TDD slot.

According to another aspect of the disclosure, a network node using new radio time division duplex, NR-TDD, is provided. The network node includes configuration module that is configured to configure positioning of at least two control messages over at least two symbols of a NR TDD slot. The at least two symbols are different symbols in a time domain.

According to another aspect of the disclosure, a wireless device using new radio time division duplex, NR-TDD, is provided. The wireless device includes operation module configured to operate according to a configured positioning of at least two control messages over at least two symbols of a NR TDD slot. The at least two symbols are different symbols in a time domain.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
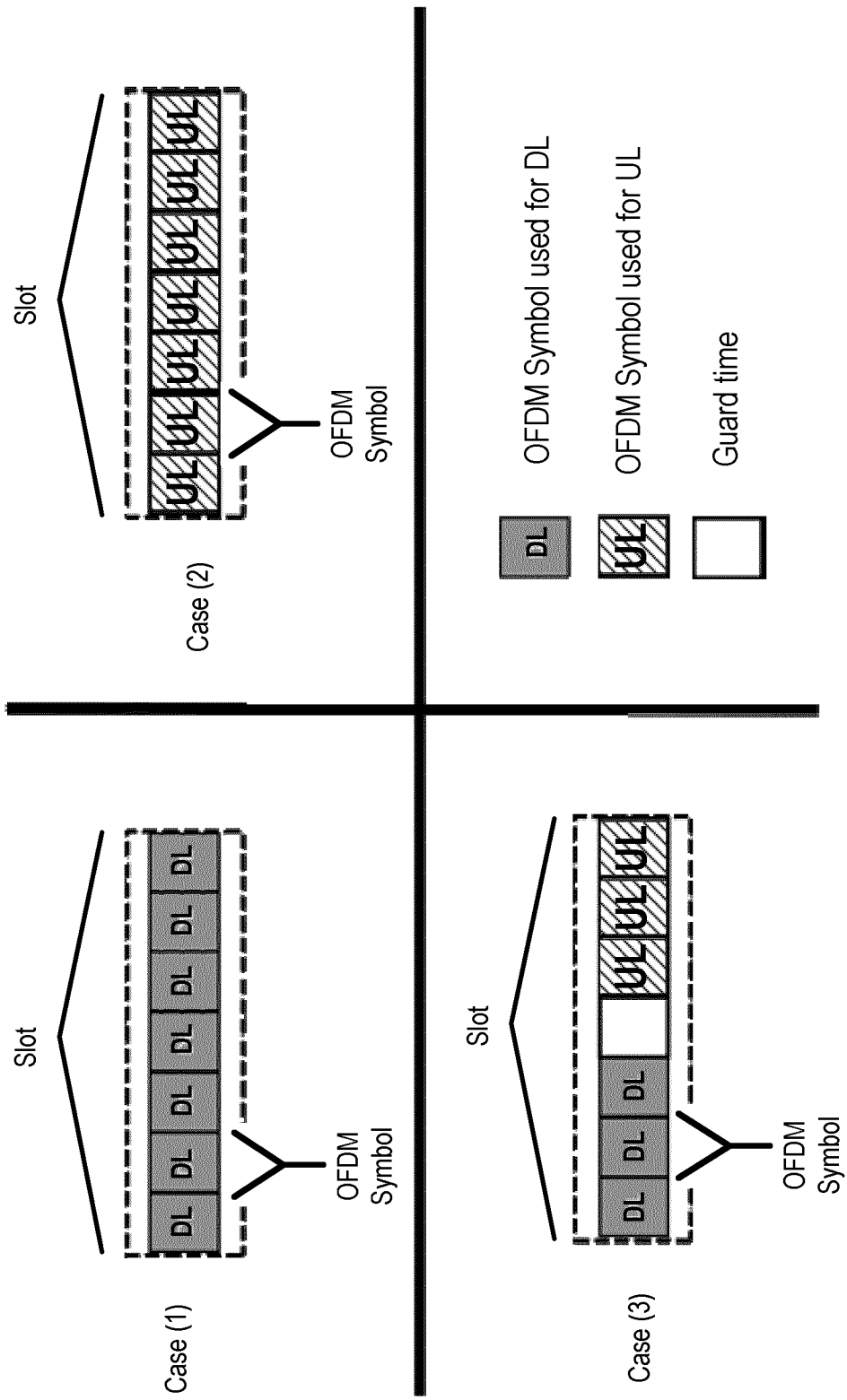
FIG. 1 is a block diagram of existing slot arrangement.

In NR-TDD the transmission opportunity delay has a large impact on latency. If downlink (DL) control is collected in one symbol in the beginning and the uplink (UL) control is collected in one symbol in the end, it is not possible to achieve a low round-trip time assuming realistic processing delay.

The disclosure is described within the context of NR, and advantageously distributes the control messages over a NR TDD slot to allow shortest possible round-trip time. In other words, at least two control messages are transmitted on different symbols in the same NR TDD slot, thereby providing at least two control channels in the NR TDD slot, where the at least two control channels could be at least two uplink channels or at least two downlink channels. This allows for the transmission latency to be minimized for both UL and DL data in NR TDD.

Before describing in detail exemplary embodiments that are in accordance with the disclosure, it is noted that the embodiments reside primarily in combinations of apparatus/node/wireless device components and processing steps related to configuring resources for control messages for optimizing Ultra-Reliable and Low-Latency Communications (URLLC) using new radio time division duplex (NR-TDD).

Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

The term "network node" or "radio network node" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

The term wireless device used herein may refer to any type of wireless device communicating with a network node and/or with another wireless device in a cellular or mobile communication system. Examples of a wireless device are user equipment (UE), target device, device to device (D2D) wireless device, machine type wireless device or wireless device capable of machine to machine (M2M) communication, PDA, iPAD, Tablet, mobile terminals, smart phone, laptop embedded equipped (LEE), laptop mounted equipment (LME), USB dongles etc.

Note further that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices located at the same or different physical locations.

Figure 2:
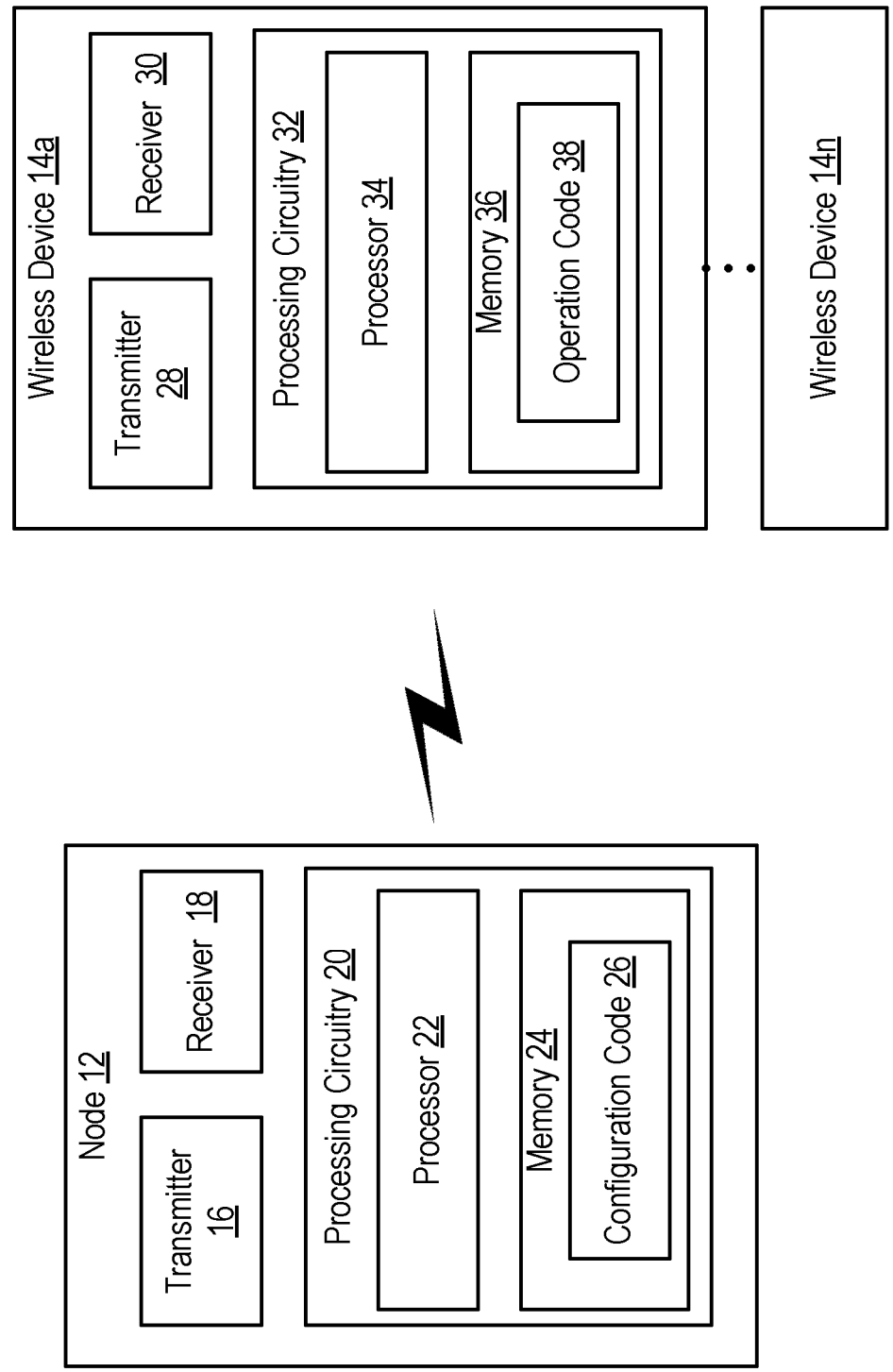
FIG. 2 is a block diagram of an exemplary configuration system in accordance with the principles of the disclosure.

Referring now to the drawing figures in which like reference designators refer to like elements there is shown in FIG. 2 a block diagram of an exemplary system for configuring resources for control messages for optimizing Ultra-Reliable and Low-Latency Communications (URLLC) using new radio time division duplex (NR-TDD) in accordance with the principles of the disclosure and designated generally as "10." System 10 includes one or more network nodes 12 and one or more wireless devices 14 in communication with each other via one or more communication links, paths and/or networks.

Network node 12 includes transmitter 16 and receiver 18 for communicating with wireless device 14, other network nodes 12 and/or other entities in system 10 via one or more communication protocols such as LTE based communication protocols. In particular, the disclosure will be described herein within the context of NR-TDD. In one or more embodiments, transmitter 16 and/or receiver 18 may be replaced with one or more communication interfaces for communicating signals, packets, messages, etc.

Network node 12 includes processing circuitry 20 containing instructions which, when executed, configure processing circuitry 20 to perform network node 12 functions such as one or more functions described herein and with respect to FIGS. 3-9. In one or more embodiments, processing circuitry 20 includes memory 24 that is configured to store code such as configuration code 26. For example, configuration code 26 includes instructions which, when executed by processor 22, causes processor 22 to perform the configuration process discussed in detail with respect to FIGS. 3-9.

In addition to processor and memory, e.g., a traditional processor and memory, processing circuitry 20 may comprise integrated circuitry for processing and/or control, e.g., one or more processors and/or processor cores and/or FPGAs (Field Programmable Gate Array) and/or ASICs (Application Specific Integrated Circuitry). Processing circuitry 20 may comprise and/or be connected to and/or be adapted for accessing (e.g., writing to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be adapted to store code executable by control circuitry and/or other data, e.g., data pertaining to communication, e.g., configuration and/or address data of nodes, modulation and coding schemes such as BPSK and QPSK, etc.

Processing circuitry 20 may be configured to control any of the methods described herein and/or to cause such methods to be performed, e.g., by network node 12. Corresponding instructions may be stored in the memory 24, which may be readable and/or readably connected to the processing circuitry 20. In other words, processing circuitry 20 may include a controller, which may comprise a microprocessor and/or microcontroller and/or FPGA (Field-Programmable Gate Array) device and/or ASIC (Application Specific Integrated Circuit) device. It may be considered that processing circuitry 20 includes or may be connected or connectable to memory, which may be adapted to be accessible for reading and/or writing by the controller and/or processing circuitry 20.

Wireless device 14 includes transmitter 28 and receiver 30 for communicating with network nodes 12, other wireless devices 14 and/or other entities in system 10 via one or more communication protocols such as LTE based communication protocols. In one or more embodiments, transmitter 28 and/or receiver 30 may be replaced with one or more communication interfaces such as an air interface and/or other interface for communicating signals, packets, messages, etc.

Wireless device 14 includes processing circuitry 32 containing instructions which, when executed, configure processing circuitry 32 to perform wireless device 12 functions such as one or more functions described herein and with respect to FIGS. 5-10 and 12. In one or more embodiments, processing circuitry 32 includes memory 36 that is configured to store code such as operation code 38. For example, operation code 38 includes instructions which, when executed by processor 34, causes processor 34 to perform the configuration process discussed in detail with respect to FIG. 4.

In addition to processor and memory, e.g., a traditional processor and memory, processing circuitry 32 may comprise integrated circuitry for processing and/or control, e.g., one or more processors and/or processor cores and/or FPGAs (Field Programmable Gate Array) and/or ASICs (Application Specific Integrated Circuitry). Processing circuitry 32 may comprise and/or be connected to and/or be adapted for accessing (e.g., writing to and/or reading from) memory 36, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 36 may be adapted to store code executable by control circuitry and/or other data, e.g., data pertaining to communication, e.g., configuration and/or address data of nodes, modulation and coding schemes such as BPSK and QPSK, etc.

Processing circuitry 32 may be configured to control any of the methods described herein and/or to cause such methods to be performed, e.g., by wireless device 14. Corresponding instructions may be stored in the memory 36, which may be readable and/or readably connected to the processing circuitry 32. In other words, processing circuitry 32 may include a controller, which may comprise a microprocessor and/or microcontroller and/or FPGA (Field-Programmable Gate Array) device and/or ASIC (Application Specific Integrated Circuit) device. It may be considered that processing circuitry 32 includes or may be connected or connectable to memory, which may be adapted to be accessible for reading and/or writing by the controller and/or processing circuitry 32.

It is assumed that wireless device 14 and the network node 12 each require one OFDM symbol for the processing of a control message and the preparation of the transmission. This assumption is made for all numerologies described herein.

Figure 3:
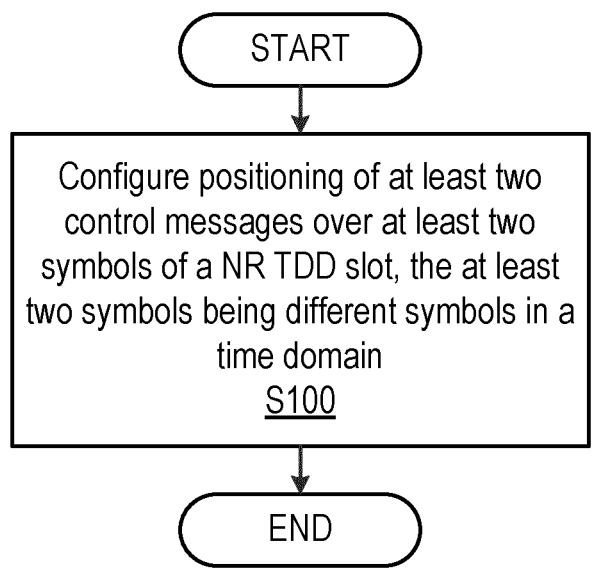
FIG. 3 is a flow diagram of an exemplary configuration process in accordance with the principles of the disclosure.
Figure 5:
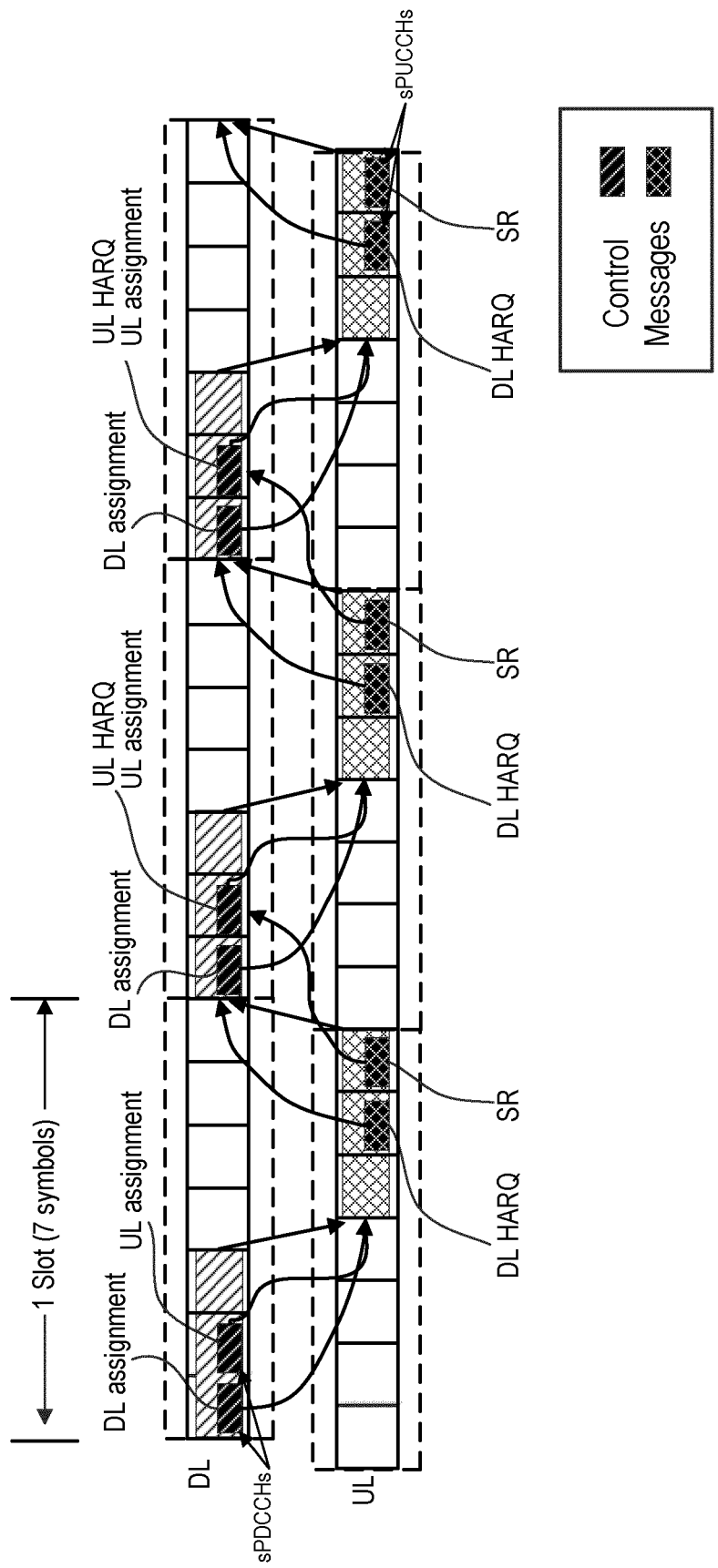
FIG. 5 is a block diagram where the control in DL and UL is spread out across different symbols to allow for the shortest possible round-trip time for UL and DL in accordance with the principles of the disclosure.

FIG. 3 is a flow diagram of an exemplary configuration process in accordance with the principles of the disclosure. In one or more embodiments, processing circuitry 20 is configured to configure positioning of at least two control messages over at least two symbols of a NR TDD slot (Block S100). For example, the two control messages are two control messages transmitted in uplink or two control messages transmitted in downlink. The configuring of positioning by the network node may be considered as any configuring of a transmission by the network node or any configuring of the wireless device which provides for downlink or uplink control messages or channels to be transmitted as described. In one or more embodiments, positioning of at least control messages over at least two symbols of a NR TDD slot includes network node 12 transmitting at least two control messages over at least two symbols of a NR TDD slot such as within at least two sPDCCHs of the NR TDD slot. For example, as illustrated in FIG. 5 (described below), network node 12 transmits at least two of the following downlink control messages: DL assignment, UL assignment and UL HARQ, to wireless device 14. In one or more embodiments, positioning of at least control messages over at least two symbols of a NR TDD slot includes configuring or causing wireless device 14 to transmit at least two uplink control messages over at least two symbols of a NR TDD slot such as within at least two sPUCCHs of the NR TDD slot. For example, as illustrated in FIG. 5 (described below), wireless device 14 is configured or caused to transmit at least two of the following uplink control messages: DL HARQ and SR, to network node 12.

For example, at least two control messages, e.g., first and second control messages, are positioned in at least two control channels such as, for example, the sPDCCHs or sPUCCHs, of a single slot (7 or 14 symbols), where the at least two control channels could be at least two uplink channels or at least two downlink channels. In another example, different configurations are described herein with respect to FIGS. 5-10, in which the configuration of resources for at least two messages on at least two symbols in the NR TDD slot advantageously optimizes Ultra-Reliable and Low-Latency Communications (URLLC) using new radio time division duplex (NR-TDD). In one or more embodiments, the symbols are OFDM symbols that may be included in one or more control channels, i.e., control symbols. In one or more embodiments, the at least two symbols are different symbols in the time domain.

In one embodiment, processing circuitry 20 is configured to configure placement of downlink control messages over at least two symbols of a NR TDD slot. In one or more embodiments, a NR TDD slot includes at least two control channels such, for example, as two sPDCCHs or sPUCCHs, in the same NR TDD slot where the at least two control channels could be at least two uplink channels or at least two downlink channels. For example, different configurations are described herein with respect to FIGS. 5-10, in which the configuration of resources for at least two messages on at least two symbols in the NR TDD slot advantageously optimizes Ultra-Reliable and Low-Latency Communications (URLLC) using new radio time division duplex (NR-TDD). In one or more embodiments, the symbols are OFDM symbols that may be included in one or more control channels, i.e., control symbols.

Figure 4:
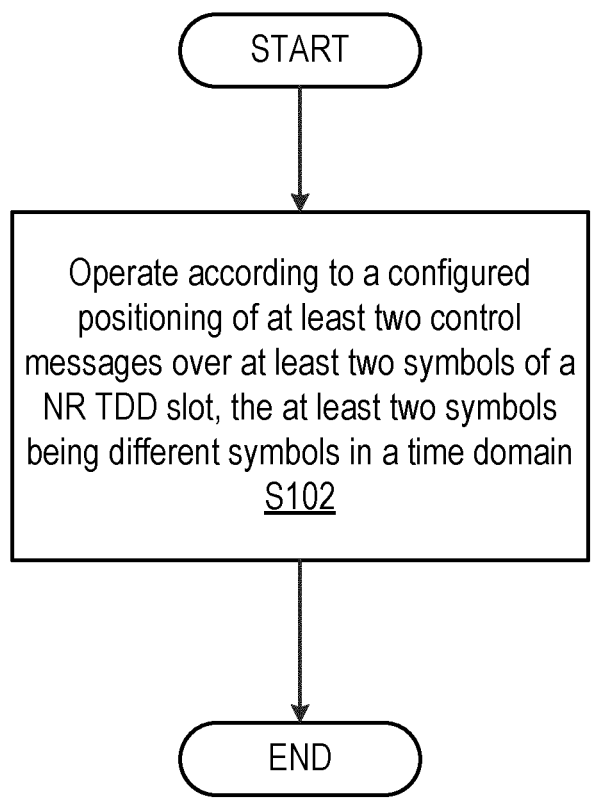
FIG. 4 is a flow diagram of another exemplary configuration process in accordance with the principles of the disclosure.

FIG. 4 is a flow diagram of another embodiment of an operational process in accordance with the principles of the disclosure. In one or more embodiments, processing circuitry 32 is configured to operate according to a configured positioning of at least two control messages over at least two symbols of a NR TDD slot (Block S102). In one or more embodiments, operating according to a configured positioning of at least two control messages over at least two symbols of a NR TDD slot includes wireless device 14 receiving at least two control messages over at least two symbols of a NR TDD slot such as within at least two sPDCCHs of the NR TDD slot. For example, as illustrated in FIG. 5 (described below), wireless device 14 receives at least two of the following downlink control messages: DL assignment, UL assignment and UL HARQ, from network node 14. In one or more embodiments, operate according to a configured positioning of at least two control messages over at least two symbols of a NR TDD slot includes wireless device 14 transmitting at least two control messages over at least two symbols of a NR TDD slot such as within at least two sPUCCHs of the NR TDD slot. For example, as illustrated in FIG. 5 (described below), wireless device 14 transmits at least two of the following uplink control messages: DL HARQ and SR to network node 12. In other words, control messages refer to messages transmitted by network node 12 and/or wireless device 14.

For example, different configurations are described herein with respect to FIGS. 5-10 in which the configuration of resources for messages on at least two symbols significantly optimizes Ultra-Reliable and Low-Latency Communications (URLLC) using new radio time division duplex (NR-TDD). In one or more embodiments, the at least two symbols are different symbols in a time domain.

In this embodiment, processing circuitry 32 is configured to configure placement of uplink control messages over at least two symbols of a NR TDD slot. For example, different configurations are described herein with respect to FIGS. 5-10, in which the configuration of resources for messages on at least two symbols significantly optimizes Ultra-Reliable and Low-Latency Communications (URLLC) using new radio time division duplex (NR-TDD).

In one or more embodiments, the processes of FIGS. 3 and 4 is combined such that the placement of both uplink (UL) control message and downlink (DL) control messages on respective symbols of a NR TDD slot is configured. As used herein, uplink refers to communications from wireless device 14 to network node 12, while downlink refers to communications from network node 12 to wireless device 14.

For example, FIG. 5 is a block diagram where the control messages in DL and UL are spread out across different symbols to allow for the shortest possible round-trip time for UL and DL. In particular, in one embodiment, a single slot such as a NR TDD slot includes two sPDCCHs or two sPUCCHs for carrying at least two control messages. The messaging, signaling, communication, etc., between network node 12 and wireless device 14 is illustrated in FIG. 5. In one or more embodiments, for the control messages:

DL assignment is transmitted in the first DL symbol of the slot to allow for early decoding of DL data. In one or more embodiments, a downlink assignment is configured to be positioned on a first symbol of the at least two symbols of the NR TDD slot;

UL assignment (carrying UL grant/UL hybrid automatic repeat request (HARQ) retransmission grant) is transmitted in the second DL symbol of the slot to allow for processing of UL data in eNB and scheduling of UL transmission (based on SR) and retransmission (based on UL data). In one or more embodiments, an uplink assignment or uplink Hybrid Automatic Repeat Request, HARQ, is configured to be positioned on a second symbol of the at least two symbols of the NR TDD slot;

DL hybrid automatic repeat request is transmitted in the second last UL symbol of the slot to allow for processing of retransmission in eNB. In one or more embodiments, a downlink Hybrid Automatic Repeat Request, HARQ, is configured to be positioned on a first symbol of the at least two symbols of the NR TDD slot; first symbol as used herein refers to any symbol of a slot; and Scheduling request (SR) is transmitted in the last UL symbol of the slot to allow for late decision on SR in the UE, and to allow for processing of UL assignment in eNB. In one or more embodiments, a scheduling request configured to be positioned on a second symbol of the at least two symbols of the NR TDD slot, the first symbol being positioned, in the time domain, before the second symbol.

In other words, network node 12 transmits control messages and receives certain data, control messages and/or signaling. The types of control messages transmitted and the type of data, control messages and/or signaling received varies based on the situation and/or examples such as those described with respect to FIG. 5. Also, wireless device 14 receives control messages and transmits data based on the control messages and/or signaling such as DL HARQ and/or SR. The types of control messages received and the type of data and/or signaling transmitted varies based on the situation and/or examples such as those described with respect to FIG. 5. In one or more embodiments, the uplink assignment is configured in a downlink symbol after the second downlink symbol of the NR TDD slot depending on the processing speed in network node 12 and/or the slot structure. In one or more embodiments, the downlink HARQ is configured in an uplink symbol earlier than the second to last uplink symbol of the NR TDD slot depending on the processing speed of network node 12 and/or slot configuration.

In some aspects, the transmission of the different control messages or channels is on different symbols (and/or different mini-slots) in a time domain, for the control channels in uplink and/or in downlink. For example, the uplink control messages are transmitted in separate symbols (and/or separate mini-slots) by a wireless device. For example, the wireless device is configured to transmit a first (e.g. DL HARQ) uplink control message in a separate, or different, symbol to a second (e.g. SR) uplink control message, in the time domain. The first and second control messages according to any example may be both uplink control messages or may be both downlink control messages. A slot may comprise either or both of uplink and downlink control messages.

In one or more embodiments, a minimum of two DL and two UL symbols in the slot such as a NR-TDD slot are used, and therefore allows a guard period of three symbols in the seven symbol slot case. In one or more embodiments, the UL assignment is transmitted in later symbols, and DL HARQ is transmitted in earlier symbols depending on the processing delay in network node 12 and wireless device 14. This configuration is also relevant for the case of fourteen OFDM symbols per slot. In one or more embodiments, multiple OFDM symbols are used for the control messages as described herein.

In one or more embodiments, wireless device 14 and/or network node 12 automatically configure the placing of UL and DL control messages based on the slot configuration:

number of DL symbols, number of guard symbols and number of UL symbols in a slot.

Physical Resources

DL Control

The location of the control messages such as the DL assignment on parts (in frequency) or the whole of the first OFDM symbol is preconfigured with a search space blindly detected by wireless device 14. This control message indicates the location of DL data, and can also indicate the location of the UL assignment on parts (in frequency) of a later symbol/symbols. Optionally, the location of the UL assignment is also a preconfigured search space blindly detected by wireless device 14.

UL Control with Data

In the presence of UL data in the slot for wireless device 14, DL HARQ and SR can be punctured into the UL data transmission for this wireless device 14 on parts of the OFDM symbols.

UL Control without Data

If wireless device 14 has no UL data to transmit but DL HARQ and/or SR to transmit, a different channel can be used (similar to the physical uplink control channel ((PUCCH)). The DL HARQ message may however still have the same distribution in time: the placement may allow for processing in wireless device 14 and in network node 12. The data symbol/symbols may therefore not come too soon, and should end before the last symbol to allow for processing. With three UL symbols a pattern of reference symbol-data symbol-reference symbol is therefore suitable, and with four symbols two data symbols can be surrounded by two reference symbols. The same structure can be used for SR if no DL HARQ is transmitted, alternatively, the last reference symbol is replaced with SR data whenever SR is to be indicated.

Figure 6:
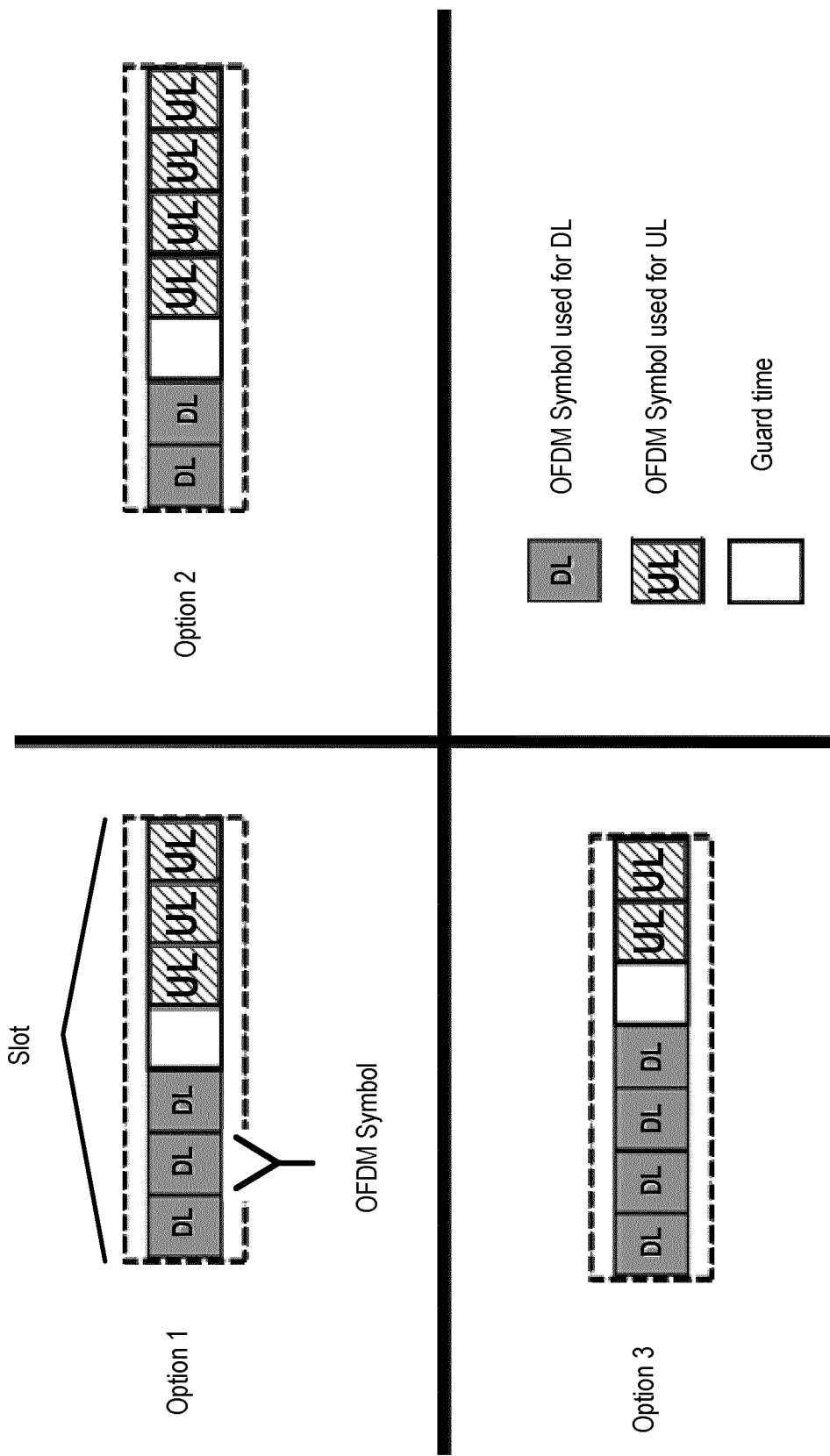
FIG. 6 is a block diagram of varying mini-slot usage in accordance with the principles of the disclosure.

The following example demonstrates how transmission and retransmission is conducted for the DL and UL case using the control channel configuration described herein. In the examples of FIGS. 6-10, it is assumed that a one mini-slot has a length of one OFDM symbol, however other mini-slot lengths can be used in accordance with the teaching of the disclosure. A slot may have a length of 14 or 7 OFDM symbols. A mini-slot may have a length of less than the slot, e.g. 1, 2 or 3 symbols, or 7 symbols for a 14 symbol slot. In TDD, uplink and downlink are transmissions are sequential in time, i.e. time division duplexed on the same frequency band. Before describing the configuration, symbol usage is described with respect to FIG. 6. In particular, the symbol usage can vary as shown in FIG. 6, options 1-3, which have an impact on the overall latency for a transmission and retransmission. Three different options for the usage of symbols: (1) same ratio of DL and UL mini-slots protected by a guard-time, (2) higher ratio of UL symbols, and (3) higher ratio of DL only symbols, are illustrated. The options described with respect to FIG. 1 may also be considered as examples of the present disclosure. The choice of symbol configuration can be indicated during run-time in the first symbol, which in this embodiment is the first mini-slot, as an adaptation to traffic needs. Thus, the placement of UL and DL control can be configured based on the control message sent in the first symbol. In some aspects, the control messages (e.g. control messages transmitted in uplink from a wireless device) may be each be transmitted on one (or more) symbols in the time domain. In some aspects, the control messages transmitted in uplink may each be transmitted on a symbol, or, in a mini-slot, e.g. within a slot, a first control message is transmitted in an uplink mini-slot and a second control message is transmitted in a further, subsequent, uplink mini-slot. In some aspects, the control messages transmitted in downlink may each be transmitted in a symbol, or, in a mini-slot, e.g. within a slot, a first control message is transmitted in a downlink mini-slot and a second control message is transmitted in a further, subsequent, downlink mini-slot. A slot may comprise uplink control messages and/or downlink control messages. In some aspects, a control message may refer to a control channel, e.g. a first control channel comprising a first control message (e.g. DL HARQ) and a second control channel comprising a second control message (e.g. SR). As such, the different control channels, e.g. different types of control message (e.g., DL HARQ or SR) are transmitted on different symbols in a time domain within a slot. The remaining examples will be discussed based on option 1 illustrated in FIG. 6. However, the approach described herein is similar for the remaining options of FIG. 6.

Figure 7:
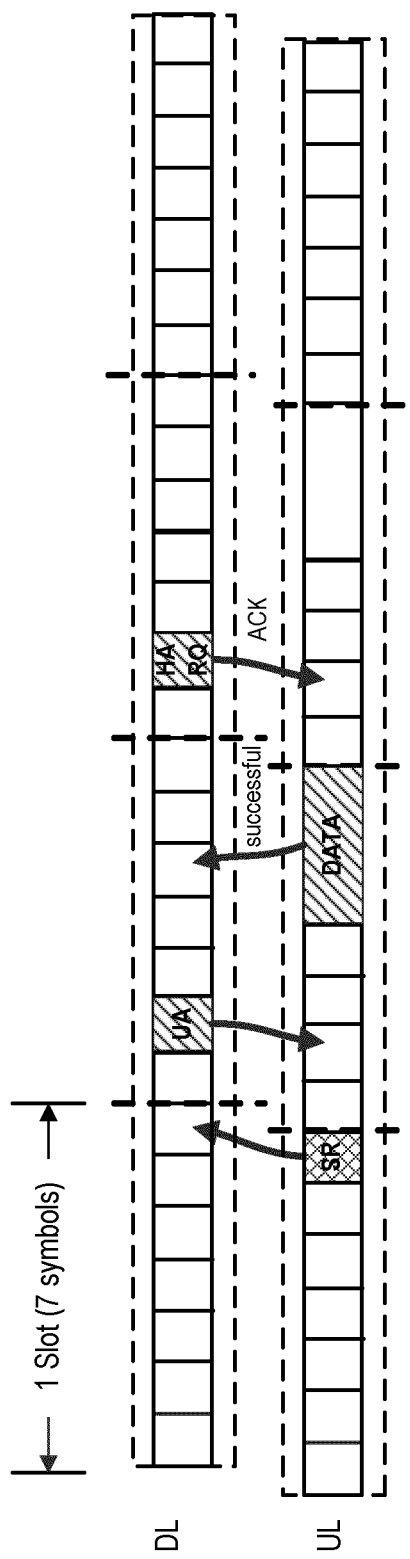
FIG. 7 is a block diagram of the uplink transmission where after a scheduling request (SR) from wireless device in mini-slot seven, first an uplink assignment (UA) in mini-slot two is send in the DL in accordance with the principles of the disclosure.

FIG. 7 is a block diagram of the uplink transmission where after a scheduling request (SR) from wireless device 14 in symbol seven, first an uplink assignment (UA) in symbol two is sent in the DL. Subsequently, a data packet is sent using the last three symbols. The HARQ DL acknowledgement is sent for this data packet in symbol two. The uplink packet transmission using option 1 is successful. In other words, network node 12 transmits control messages and receives data and/or signaling. The types of control messages transmitted and the type of data received varies based on the situation and/or examples such as those described with respect to FIG. 5. Also, wireless device 14 receives control messages and transmits data based on the control messages and/or transmits signaling. The types of control messages received and the type of data and/or signaling transmitted varies based on the situation and/or examples such as those described with respect to FIG. 7.

Figure 8:
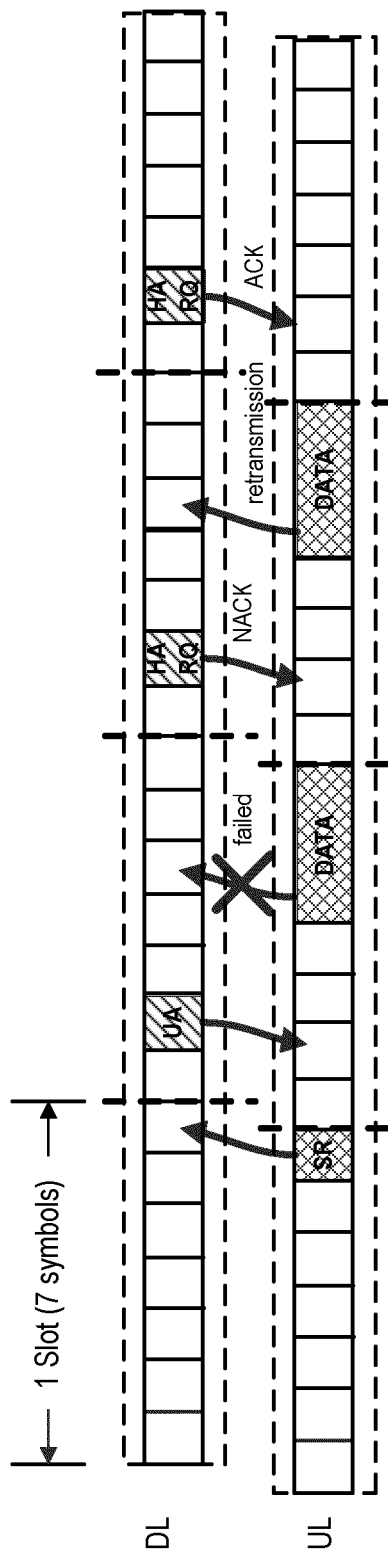
FIG. 8 is a block diagram illustrating the situation where an uplink transmission fails and a retransmission takes place in accordance with the principles of the disclosure.

FIG. 8 is a block diagram illustrating the situation where an uplink transmission fails and a retransmission takes place. In other words, network node 12 transmits control messages and receives data and/or signaling. The types of control messages transmitted and the type of data and/or signaling received varies based on the situation and/or examples such as those described with respect to FIG. 8. Also, wireless device 14 receives control messages and transmits data based on the control messages and/ transmit signaling. The types of control messages received and the type of data and/or signaling transmitted varies based on the situation and/or examples such as those described with respect to FIG. 8.

Figure 9:
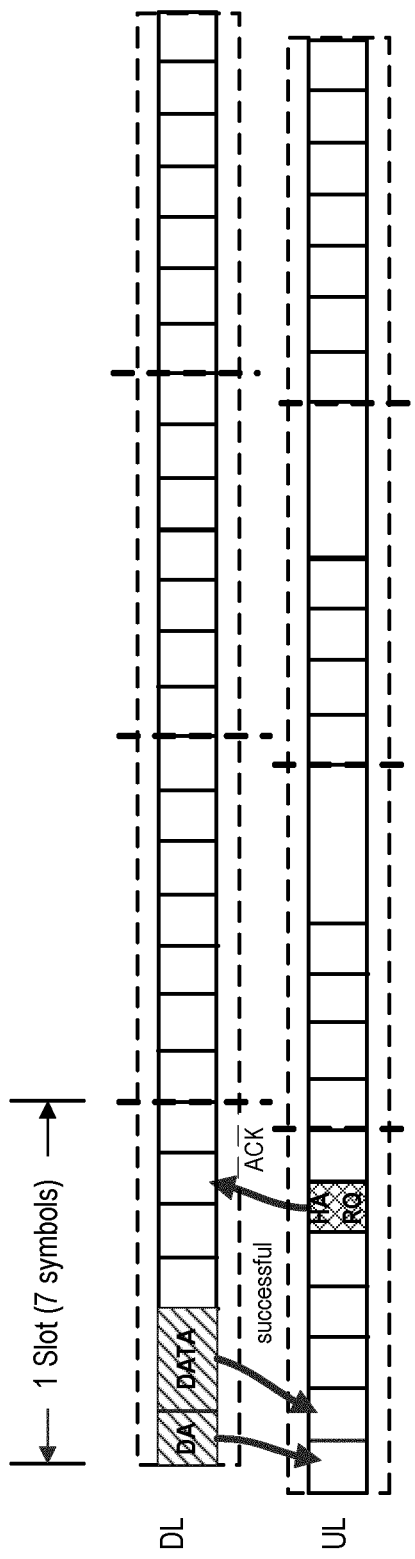
FIG. 9 is a block diagram illustrating the situation with a successful downlink transmission in accordance with the principles of the disclosure.

FIG. 9 is a block diagram illustrating the situation with a successful downlink transmission. In other words, network node 12 transmits control messages and receives data and/or signaling. The types of control messages transmitted and the type of data and/or signaling received varies based on the situation and/or examples such as those described with respect to FIG. 9. Also, wireless device 14 receives control messages and transmits data based on the control messages and/or transmits signaling. The types of control messages received and the type of data and/or signaling transmitted varies based on the situation and/or examples such as those described with respect to FIG. 9.

Figure 10:
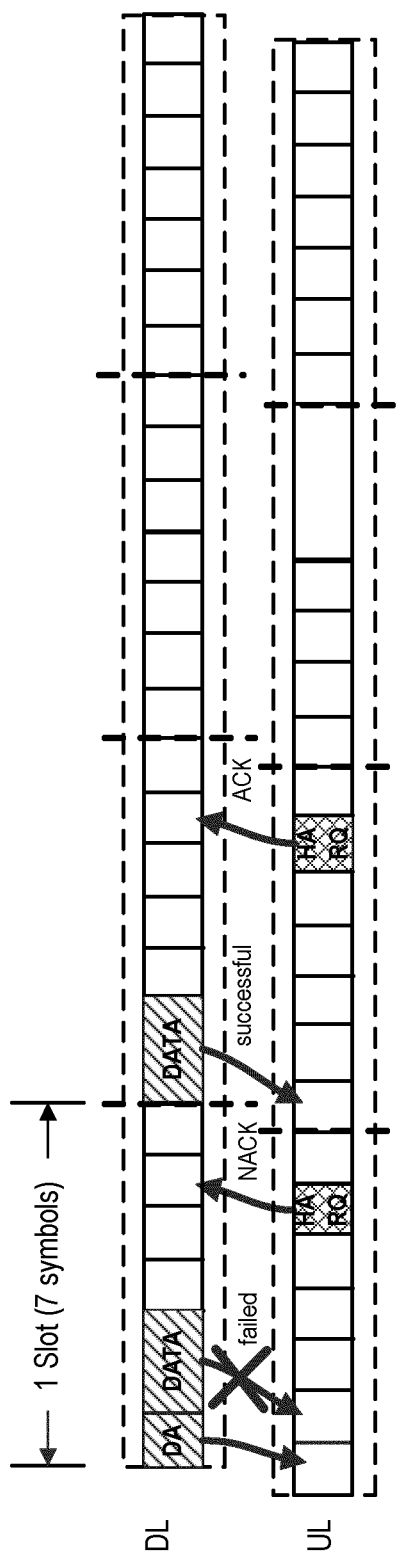
FIG. 10 is a block diagram illustrating the situation where a downlink data transmission fails and is transmitted afterwards.

FIG. 10 is a block diagram illustrating the situation where a downlink data transmission fails and is transmitted afterwards. In other words, network node 12 transmits control messages and receives data and/or signaling. The types of control messages transmitted and the type of data and/or signaling received varies based on the situation and/or examples such as those described with respect to FIG. 10. Also, wireless device 14 receives control messages and transmits data based on the control messages and/or transmits signaling. The types of control messages received and the type of data and/or signaling transmitted varies based on the situation and/or examples such as those described with respect to FIG. 10.

Figure 11:
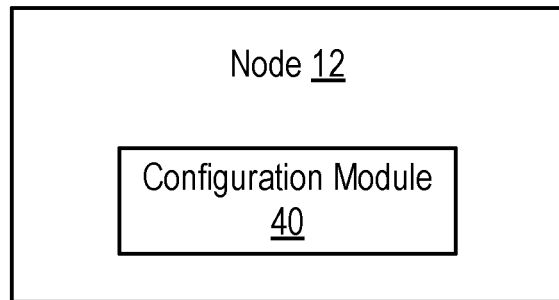
FIG. 11 is a block diagram of an alternative embodiment of a node in accordance with the principles of the disclosure.

FIG. 11 is a block diagram of an alternative embodiment of node 12 in accordance with the principles of the disclosure. Network node 12 includes configuration module 40 that performs the configuration process discussed in detail with respect to FIGS. 3 and 4, and the network node 12 signaling described in FIGS. 5-10. Therefore, the network distributes the control and feedback resources for wireless device 14 over the OFDM symbols in a slot so that the lowest possible latency can be realized in NR-TDD.

Figure 12:
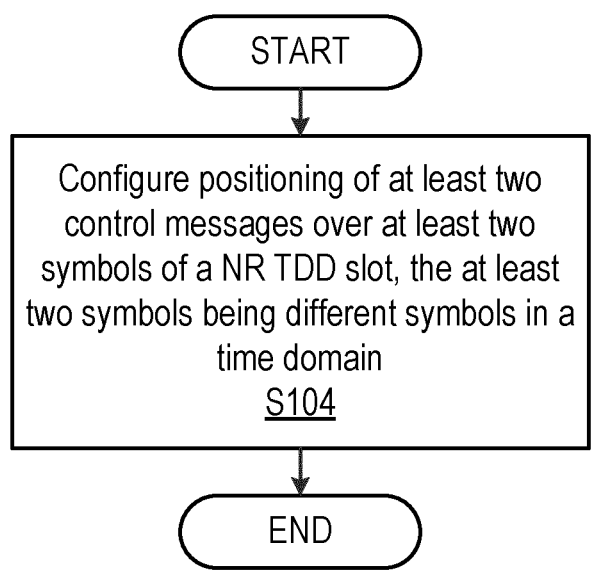
FIG. 12 is a flow diagram of an exemplary operation process in accordance with the principles of the disclosure.

FIG. 12 is a flow diagram of an exemplary operational process of operation module 42 in accordance with the principles of the disclosure. Processing circuitry is configured to operate according to a configured positioning of at least two control messages over at least two symbols of a NR TDD slot in which the at least two symbols being different symbols in a time domain (Block S104). In one or more embodiments, processing circuitry 32 is configured to receive control messages in which the control messages are placed in at least two symbols of a new radio time division duplex (NR-TDD) slot. In one or more embodiments, processing circuitry 32 is configured to transmit information. For example, in one or more embodiments, the information is transmitted based on the received control messages. In one or more embodiments, processing circuitry 32 performs blind detection of an indication of the configuration of the placement of control messages, i.e., performs blind detection of an indication of the configuration of the placement of control messages as described above with respect to the "Physical Resources" section such as the "DL control", "UL control with data" and "UL control without data" sections. For example, based on the control messages, wireless device 14 is able to transmit signal(s), message(s) and/or information as described with respect to FIGS. 5-10, and/or knows to expect signal(s), message(s) and/or information as described with respect to FIGS. 5-10.

Figure 13:
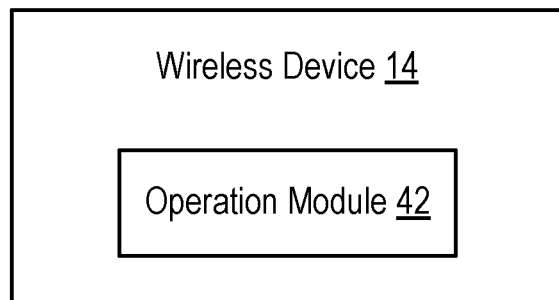
FIG. 13 is a block diagram of an alternative embodiment of a wireless device in accordance with the principles of the disclosure.

FIG. 13 is a block diagram of an alternative embodiment of wireless device 14 in accordance with the principles of the disclosure. Wireless device 14 includes operation module 42 that performs the configuration process discussed in detail with respect FIG. 12, and perform wireless device 14 messaging described in FIGS. 5-10.

Some Embodiments

According to one embodiment of the disclosure, a network node 12 using new radio time division duplex, NR-TDD, is provided. The network node 12 includes processing circuitry 20 configured to configure placement of downlink control messages over at least two symbols of a NR TDD slot.

According to one aspect of the embodiment, the downlink control messages include a downlink assignment and an uplink assignment, the downlink assignment being configured on a different symbol of the NR TDD slot than the uplink assignment. According to one aspect of the embodiment, the uplink assignment is configured in a second downlink symbol of the NR TDD slot. According to one aspect of the embodiment, the downlink assignment is configured in a first downlink symbol of the NR TDD slot.

According to one aspect of the embodiment, the processing circuitry 20 is further configured to configure uplink control messages over at least two other symbols of the NR TDD slot. According to one aspect of the embodiment, the uplink control messages include a downlink hybrid automatic repeat request, HARQ, and a scheduling request, the downlink HARQ being configured on a different symbol of the NR TDD slot than the scheduling request. According to one aspect of the embodiment, the scheduling request is configured in a last uplink symbol of the NR TDD slot. According to one aspect of the embodiment, the downlink HARQ is configured in a second to last uplink symbol of the NR TDD slot. According to one aspect of this embodiment, at least one of the downlink control messages indicates one of a location of downlink data and a location of an uplink assignment.

According to another embodiment of the disclosure, a method for using new radio time division duplex, NR-TDD, is provided. Placement of downlink control messages are configured over at least two symbols of a NR TDD slot.

According to one aspect of the embodiment, the downlink control messages include a downlink assignment and an uplink assignment. The downlink assignment is configured on a different symbol of the NR TDD slot than the uplink assignment. According to one aspect of the embodiment, the uplink assignment is configured in a second downlink symbol of the NR TDD slot. According to one aspect of the embodiment, the downlink assignment is configured in a first downlink symbol of the NR TDD slot. According to one aspect of the embodiment, uplink control messages are configured over at least two other symbols of the NR TDD slot.

According to one aspect of the embodiment, the uplink control messages include a downlink hybrid automatic repeat request, HARQ, and a scheduling request. The downlink HARQ being configured on a different symbol of the NR TDD slot than the scheduling request. According to one aspect of the embodiment, the scheduling request is configured in a last uplink symbol of the NR TDD slot. According to one aspect of the embodiment, the downlink HARQ is configured in a second to last uplink symbol of the NR TDD slot. According to one aspect of this embodiment, at least one of the downlink control messages indicates one of a location of downlink data and a location of an uplink assignment.

According to another embodiment of the disclosure, a network node 12 is provided. The node includes a configuration module configured to configure placement of downlink control messages over at least two symbols of a NR TDD slot.

According to another embodiment of the disclosure, a wireless device 14 is provided. The wireless device 14 includes processing circuitry 32 configured to: receive control messages, and transmit information. The control messages are placed in at least two symbols of a new radio time division duplex, NR-TDD, slot.

According to one aspect of the embodiment, the control messages includes downlink control messages places over the at least two symbols of a NR TDD slot. According to one aspect of the embodiment, the downlink control messages include a downlink assignment and an uplink assignment. The downlink assignment is configured on a different symbol of the NR TDD slot than the uplink assignment. According to one aspect of the embodiment, the control messages includes uplink control messages places over the at least two symbols of a NR TDD slot.

According to one aspect of the embodiment, the uplink control messages a downlink hybrid automatic repeat request, HARQ, and a scheduling request. The downlink HARQ is configured on a different symbol of the NR TDD slot than the scheduling request. According to one aspect of the embodiment, the processing circuitry 32 is further configured to perform blind detection of an indication of the configuration of the placement of the control messages. According to one aspect of the embodiment, the transmitted information is based at least in part on the received control messages. According to one aspect of this embodiment, at least one of the downlink control messages indicates one of a location of downlink data and a location of an uplink assignment.

According to another embodiment of the disclosure, a wireless device 14 is provided. The wireless device 14 includes an assignment module configured to receive control messages, and transmit information. The control messages are placed in at least two symbols of a new radio time division duplex, NR-TDD, slot.

Some Other Embodiments

According to one aspect of the disclosure, a network node 12 using new radio time division duplex, NR TDD, is provided. The network node 12 includes processing circuitry 20 configured to configure positioning of at least two control messages over at least two symbols of a NR TDD slot. The at least two symbols are different symbols in a time domain. In some aspects, the configuring positioning of at least two control messages may be configuring positioning of uplink control messages to be transmitted from a wireless device 14. In some aspects, the network node 12 receives uplink control messages from a wireless device 14 which have a position configured as described in any example.

According to one embodiment of this aspect, each control message corresponds to a respective symbol of the at least two symbols of the NR TDD slot. According to one embodiment of this aspect, the at least two control messages include: a downlink Hybrid Automatic Repeat Request, HARQ, configured to be positioned on a first symbol of the at least two symbols of the NR TDD slot; and a scheduling request configured to be positioned on a second symbol of the at least two symbols of the NR TDD slot. The first symbol is positioned, in the time domain, before the second symbol.

According to one embodiment of this aspect, a first control message of the at least two control messages are in a short Physical Uplink Control Channel, sPUCCH, and a second control message of the at least two control messages are in another sPUCCH within the NR TDD slot. According to one embodiment of this aspect, a second control message corresponds to the last symbol of the symbols used for uplink and/or corresponds to the last symbol of the NR TDD slot.

According to one embodiment of this aspect, the at least two control messages are at least two Physical Downlink Control Channel, PDCCH, messages or at least two Physical Uplink Control Channel, PUCCH, messages. According to one embodiment of this aspect, the at least two control messages include: a downlink assignment configured to be positioned on a first symbol of the at least two symbols of the NR TDD slot; and an uplink assignment or uplink Hybrid Automatic Repeat Request, HARQ, configured to be positioned on a second symbol of the at least two symbols of the NR TDD slot. The first symbol is positioned, in the time domain, before the second symbol.

According to one embodiment of this aspect, a first control message of the at least two control messages are in a short Physical Downlink Control Channel, sPDCCH, and a second control message of the at least two control messages are in another sPDCCH within the NR TDD slot. According to one embodiment of this aspect, the first control message corresponds to the first symbol of the symbols used for downlink and/or corresponds to a beginning symbol of the NR TDD slot. According to one embodiment of this aspect, the positioning of the at least two symbols in the time domain is based on at least one of a number of downlink symbols in the NR TDD slot, a number of guard symbols in the NR TDD slot and a number of uplink symbols in the NR TDD slot. According to one embodiment of this aspect, the at least two symbols are consecutive symbols in the NR TDD slot.

According to another aspect of the disclosure, a method for a network node 12 using new radio time division duplex, NR TDD, is provided. Positioning of at least two control messages over at least two symbols of a NR TDD slot is configured. The at least two symbols are different symbols in a time domain.

According to one embodiment of this aspect, each control message corresponds to a respective symbol of the at least two symbols of the NR TDD slot. According to one embodiment of this aspect, the at least two control messages include: a downlink Hybrid Automatic Repeat Request, HARQ, configured to be positioned on a first symbol of the at least two symbols of the NR TDD slot; and a scheduling request configured to be positioned on a second symbol of the at least two symbols of the NR TDD slot. The first symbol is positioned, in the time domain, before the second symbol.

According to one embodiment of this aspect, the first control message of the at least two control messages are in a symbol provides a short Physical Uplink Control Channel, sPUCCH, and a second control message of the at least two control messages are in another sPUCCH within the NR TDD slot. According to one embodiment of this aspect, a second control message corresponds to the last symbol of the symbol used for uplink and/or corresponds to the last symbol of the NR TDD slot.

According to one embodiment of this aspect, the at least two control messages are at least two Physical Downlink Control Channel, PDCCH, messages or at least two Physical Uplink Control Channel, PUCCH, messages. According to one embodiment of this aspect, the at least two control messages include: a downlink assignment configured to be positioned on a first symbol of the at least two symbols of the NR TDD slot; and an uplink assignment or uplink Hybrid Automatic Repeat Request, HARQ, configured to be positioned on a second symbol of the at least two symbols of the NR TDD slot. The first symbol is positioned, in the time domain, before the second symbol.

According to one embodiment of this aspect, a first control message of the at least two control messages are in a short Physical Downlink Control Channel, sPDCCH, and a second control message of the at least two control messages are in another sPDCCH within the NR TDD slot. According to one embodiment of this aspect, the first control message corresponds to the first symbol of the symbols used for downlink and/or corresponds to a beginning symbol of the NR TDD slot. According to one embodiment of this aspect, the positioning of the at least two symbols in the time domain is based on at least one of a number of downlink symbols in the NR TDD slot, a number of guard symbols in the NR TDD slot and a number of uplink symbols in the NR TDD slot. According to one embodiment of this aspect, the at least two symbols are consecutive symbols in the NR TDD slot.

According to another aspect of the disclosure, a wireless device 14 using new radio time division duplex, NR-TDD, is provided. The wireless device 14 includes processing circuitry 32 configured to: operate according to a configured positioning of at least two control messages over at least two symbols of a NR TDD slot. The at least two symbols are different symbols in a time domain.

According to one embodiment of this aspect, each control message corresponds to a respective symbol of the at least two symbols of the NR TDD slot. According to one embodiment of this aspect, the at least two control messages include: a downlink Hybrid Automatic Repeat Request, HARQ, configured to be positioned on a first symbol of the at least two symbols of the NR TDD slot; and a scheduling request configured to be positioned on a second symbol of the at least two symbols of the NR TDD slot. The first symbol is positioned, in the time domain, before the second symbol. According to one embodiment of this aspect, a first control message of the at least two control messages are in a short Physical Uplink Control Channel, sPUCCH, and a second control message of the at least two control messages are in another sPUCCH within the NR TDD slot.

According to one embodiment of this aspect, a second control message corresponds to the last symbol of the symbols used for uplink and/or corresponds to the last symbol of the NR TDD slot. According to one embodiment of this aspect, the at least two control messages are at least two Physical Downlink Control Channel, PDCCH, messages or at least two Physical Uplink Control Channel, PUCCH, messages. According to one embodiment of this aspect, the at least two control messages include: a downlink assignment configured to be positioned on a first symbol of the at least two symbols of the NR TDD slot; and an uplink assignment or uplink Hybrid Automatic Repeat Request, HARQ, configured to be positioned on a second symbol of the at least two symbols of the NR TDD slot. The first symbol is positioned, in the time domain, before the second symbol.

According to one embodiment of this aspect, a first control messages of the at least two control messages are in a short Physical Downlink Control Channel, sPDCCH, and a second control message of the at least two control messages are in another sPDCCH within the NR TDD slot. According to one embodiment of this aspect, the first control message corresponds to the first symbol of the symbols used for downlink and/or corresponds to a beginning symbol of the NR TDD slot. According to one embodiment of this aspect, wherein the positioning of the at least two symbols in the time domain is based on at least one of a number of downlink symbols in the NR TDD slot, a number of guard symbols in the NR TDD slot and a number of uplink symbols in the NR TDD slot. According to one embodiment of this aspect, the at least two symbols are consecutive symbols in the NR TDD slot.

According to another embodiment of the disclosure, a method for a wireless device 14 using new radio time division duplex, NR-TDD, is provided. The wireless device 14 operates according to a configured positioning of at least two control messages over at least two symbols of a NR TDD slot. The at least two symbols are different symbols in a time domain. In some aspects, the configuring positioning of at least two control messages may be configuring positioning of uplink control messages to be transmitted from the wireless device. In some aspects, the wireless device transmits the uplink control messages which have a position configured as described in any example.

According to one embodiment of this aspect, each control message corresponds to a respective symbol of the at least two symbols of the NR TDD slot. According to one embodiment of this aspect, the at least two control messages include: a downlink Hybrid Automatic Repeat Request, HARQ, configured to be positioned on a first symbol of the at least two symbols of the NR TDD slot; and a scheduling request configured to be positioned on a second symbol of the at least two symbols of the NR TDD slot. The first symbol is positioned, in the time domain, before the second symbol. According to one embodiment of this aspect, a first control message of the at least two control messages are in a short Physical Uplink Control Channel, sPUCCH, and a second control message of the at least two control messages are in another sPUCCH within the NR TDD slot.

According to one embodiment of this aspect, the second symbol corresponds to the last symbol of the NR TDD slot. According to one embodiment of this aspect, the at least two control messages are at least two Physical Downlink Control Channel, PDCCH, messages or at least two Physical Uplink Control Channel, PUCCH, messages. According to one embodiment of this aspect, the at least two control messages include: a downlink assignment configured to be positioned on a first symbol of the at least two symbols of the NR TDD slot; and an uplink assignment or uplink Hybrid Automatic Repeat Request, HARQ, configured to be positioned on a second symbol of the at least two symbols of the NR TDD slot. The first symbol is positioned, in the time domain, before the second symbol.

According to one embodiment of this aspect, a first control messages of the at least two control messages are in a short Physical Downlink Control Channel, sPDCCH, and a second control message of the at least two control messages are in another sPDCCH within the NR TDD slot. According to one embodiment of this aspect, the first control message corresponds to the first symbol of the symbols used for downlink and/or corresponds to a beginning symbol of the NR TDD slot.

According to one embodiment of this aspect, the positioning of the at least two symbols in the time domain is based on at least one of a number of downlink symbols in the NR TDD slot, a number of guard symbols in the NR TDD slot and a number of uplink symbols in the NR TDD slot. According to one embodiment of this aspect, the at least two symbols are consecutive symbols in the NR TDD slot.

According to another aspect of the disclosure, a network node 12 using new radio time division duplex, NR-TDD, is provided. The network node 12 includes configuration module 40 that is configured to configure positioning of at least two control messages over at least two symbols of a NR TDD slot. The at least two symbols are different symbols in a time domain.

According to another aspect of the disclosure, a wireless device 14 using new radio time division duplex, NR-TDD, is provided. The wireless device 14 includes operation module 42 configured to operate according to a configured positioning of at least two control messages over at least two symbols of a NR TDD slot. The at least two symbols are different symbols in a time domain.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node using new radio time division duplex, NR TDD, the network node comprising:
  processing circuitry configured to:
    configure positioning of at least two control messages over at least two symbols of a single NR TDD slot comprising an uplink part and a downlink part, the uplink part including a last symbol in a time domain and a second-to-last symbol in the time domain, the at least two symbols being different symbols in the time domain of the uplink part, the at least two control messages comprising:
      a downlink Hybrid Automatic Repeat Request, HARQ, configured to be positioned on the second-to-last symbol of the uplink part of the NR TDD slot; and
      a scheduling request configured to be positioned on the last symbol of the uplink part of the NR TDD slot.

2. The network node of claim 1, wherein the downlink part of the NR TDD slot includes a first symbol in a time domain and a second symbol in the time domain, the at least two control messages further including:
  a downlink assignment configured to be positioned on the first symbol of the downlink part of the NR TDD slot; and
  an uplink assignment or uplink Hybrid Automatic Repeat Request, HARQ, configured to be positioned on the second symbol of the downlink part of the NR TDD slot.

3. A method for a network node using new radio time division duplex, NR TDD, the method comprising:
  configuring positioning of at least two control messages over at least two symbols of a single NR TDD slot comprising an uplink part and a downlink part, the uplink part including a last symbol in a time domain and a second-to-last symbol in the time domain, the at least two symbols being different symbols in the time domain of the uplink part, the at least two control messages comprising:
    a downlink Hybrid Automatic Repeat Request, HARQ, configured to be positioned on the second-to-last symbol of the uplink part of the NR TDD slot; and
    a scheduling request configured to be positioned on the last symbol of the uplink part of the NR TDD slot.

4. The method of claim 3, wherein the downlink part of the NR TDD slot includes a first symbol in a time domain and a second symbol in the time domain, the at least two control messages further including:

a downlink assignment configured to be positioned on the first symbol of the downlink part of the NR TDD slot; and an uplink assignment or uplink Hybrid Automatic Repeat Request, HARQ, configured to be positioned on the second symbol of the downlink part of the NR TDD slot.

5. A wireless device using new radio time division duplex, NR-TDD, the wireless device comprising:
processing circuitry configured to:
operate according to a configured positioning of at least two control messages over at least two symbols of a single NR TDD slot comprising an uplink part and a downlink part, the uplink part including a last symbol in a time domain and a second-to-last symbol in the time domain, the at least two symbols being different symbols in the time domain of the uplink part, the at least two control messages comprising:
a downlink Hybrid Automatic Repeat Request, HARQ, configured to be positioned on the second-to-last symbol of the uplink part of the NR TDD slot; and
a scheduling request configured to be positioned on the last symbol of the uplink part of the NR TDD slot.

6. The wireless device of claim 5, wherein the downlink part of the NR TDD slot includes a first symbol in a time domain and a second symbol in the time domain, the at least two control messages further including:
a downlink assignment configured to be positioned on the first symbol of the downlink part of the NR TDD slot; and
an uplink assignment or uplink Hybrid Automatic Repeat Request, HARQ, configured to be positioned on the second symbol of the downlink part of the NR TDD slot.

7. A method for a wireless device using new radio time division duplex, NR-TDD, the method comprising:
operating according to a configured positioning of at least two control messages over at least two symbols of a single NR TDD slot comprising an uplink part and a downlink part, the uplink part including a last symbol in a time domain and a second-to-last symbol in the time domain, the at least two symbols being different symbols in the time domain of the uplink part, the at least two control messages comprising:
a downlink Hybrid Automatic Repeat Request, HARQ, configured to be positioned on the second-to-last symbol of the uplink part of the NR TDD slot; and
a scheduling request configured to be positioned on the last symbol of the uplink part of the NR TDD slot.

8. The method of claim 7, wherein the downlink part of the NR TDD slot includes a first symbol in a time domain and a second symbol in the time domain, the at least two control messages further including:
a downlink assignment configured to be positioned on the first symbol of the downlink part of the NR TDD slot; and
an uplink assignment or uplink Hybrid Automatic Repeat Request, HARQ, configured to be positioned on the second symbol of the downlink part of the NR TDD slot.

* * * * *